(12) United States Patent
Bills (10) Patent No.: US 8,485,584 B2
(45) Date of Patent: Jul. 16, 2013

(54) SUN SHADE PANEL AND DEVICE (76) Inventor: Michael Bills, Huntington Beach, CA (US)

( * ) Notice: Subject to any disclaimer, the term of this patent is extended or adjusted under 35 U.S.C. 154(b) by 0 days.

(21) Appl. No.: 13/477,024

(22) Filed: May 21, 2012

(65) Prior Publication Data

US 2012/0292941 A1 Nov. 22, 2012

Related U.S. Application Data (60) Provisional application No. 61/488,059, filed on May 19, 2011.

(51) Int. Cl.
*B60J 3/00* (2006.01)

(52) U.S. Cl.
USPC ....................................................... 296/97.2

(58) Field of Classification Search
USPC .................... 296/97.1, 97.2, 97.5, 97.8, 97.9, 296/97.11; 160/87, 130
See application file for complete search history.

(56) References Cited

U.S. PATENT DOCUMENTS

| | | | | |
|---|---|---|---|---|
| 2,707,311 | A * | 5/1955 | Orlin | 49/125 |
| 4,248,474 | A * | 2/1981 | Mandrick | 296/97.6 |
| 4,944,548 | A * | 7/1990 | Payne et al. | 296/97.8 |
| 4,958,879 | A * | 9/1990 | Gillum | 296/97.6 |
| 5,112,096 | A * | 5/1992 | Keenan | 296/97.6 |
| 6,318,789 | B1 * | 11/2001 | Stuart | 296/97.8 |
| 6,371,546 | B1 * | 4/2002 | Jefferson | 296/97.8 |
| 6,513,855 | B2 * | 2/2003 | Zenisek | 296/97.9 |
| 2008/0156423 | A1 * | 7/2008 | Reuter | 156/230 |
| 2011/0017382 | A1 * | 1/2011 | Reuter | 156/108 |

* cited by examiner

*Primary Examiner* — Lori Lyjak
(74) *Attorney, Agent, or Firm* — John R. Ross; John R. Ross, III

(57) ABSTRACT

A method and device for blocking sun rays from shining through the side window of a vehicle. Custom sized sun shade panels are cut. A first sun shade panel is inserted between the window and window seal of the side window of a vehicle. Then at least one other sun shade panel is inserted adjacent to the first sun shade panel to form a stack of sun shade panels. The number of sun shade panels in the stack may be adjusted to achieve the desired blockage of sun rays from entering the vehicle.

17 Claims, 7 Drawing Sheets

Stationary Window with Window Trim (not seal)

1. Panel
2. Trim
3. Stationary Glass

FIG. 17

Complete Black Out

1. Panel
2. Trim
3. Stationary Glass

FIG. 18

Side Cutaway View Movable Window

1. Panel
2. Trim
3. Stationary Glass
4. Seal Out of Sun Rays

This drawing shows the utilization and insertion of Panel 1. The arrows represent the compressive strength between glass 3 and seal 2.

FIG. 19

Side Cutaway View Stationary Window

This drawing shows the utilization and insertion of Panel 1. The arrows represent the compressive strength between glass 3 and trim 2 and sealant 4.

SUN SHADE PANEL AND DEVICE

This application claims the benefit of Provisional Application 61/488,059 filed May 19, 2011. The present invention relates to automobile accessories and in particular to automobile sun shade devices.

BACKGROUND OF THE INVENTION

Excessive sun exposure is extremely dangerous. For example, too much sun exposure can cause painful sunburn, immune system suppression, skin rashes, premature aging of the skin and skin cancer. Yet even with modern understanding of the harmful effects of sun exposure, most people still do not protect themselves adequately from the sun.

During the summer a small percentage of the population may think to apply sunscreen if they know they will be spending significant time outdoors. However, most of these people will not apply sunscreen if they think they are going to be indoors or in a covered area, such as their automobile.

The Automobile Provides a False Sense of Security from Sun Damage

It is true that the clear window glass found in automobiles blocks UV-B rays (UV-B rays cause sunburn). However, unless the window glass is specially coated or tinted, the car window does not block UV-A rays. UV-A rays are rays that can tan the skin. UV-A rays are also very dangerous because these are the rays that penetrate deep and can cause skin damage, possibly even skin cancer.

Sun Rays are an Irritating Distraction to the Driver and Passengers

In addition to being dangerous to the skin, sun rays are a dangerous and irritating distraction to the driver. Most automobiles include a car visor for blocking the suns rays in the driver's eyes. But unfortunately, the visor does not prevent sun rays from bothering the driver if they are coming at the driver from the driver's window. Also, passengers (especially rear passengers) do not usually have a visor for blocking sun rays either from the side or rear of the vehicle.

Other prior art sun protection devices for the automobile include the use of hooks, suction cups, adhesives or static electricity to hold a sun shade device in its desired position. The prior art sun shade device usually shades the eyes and provides some measure of shade while inside the vehicle. Prior art shade devices are inadequate because sun rays tend to reach the person in the automobile causing him to surrender to partial sun and partial shade.

What is needed is a better shade device for a car.

SUMMARY OF THE INVENTION

The present invention provides a method and device for blocking sun rays from shining through the side window of a vehicle. Custom sized sun shade panels are cut. A first sun shade panel is inserted between the window and window seal of the side window of a vehicle. Then at least one other sun shade panel is inserted adjacent to the first sun shade panel to form a stack of sun shade panels. The number of sun shade panels in the stack may be adjusted to achieve the desired blockage of sun rays from entering the vehicle.

DETAILED DESCRIPTION OF THE PREFERRED EMBODIMENTS

The present invention provides a thin flat panel that can be inserted into the area formed between the window and the seal or trim of an automobile. Hereinafter, when Applicant refers to seal it should be understood that a trim can be substituted for the seal. A trim is typically used for stationary windows, a seal is typically used with movable windows. The compressive force between the window and the seal holds the flat panel in place. The panel can be inserted anywhere along the surface of the window (i.e., along the bottom of the window, along the side of the window or at the top of the window).

Figure 1:
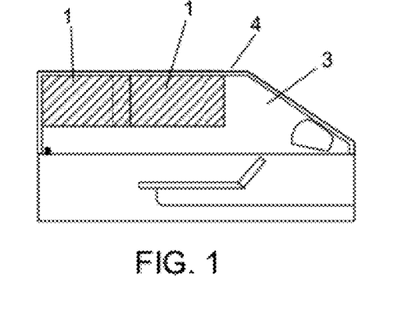
FIGS. 1-17 show front views of preferred embodiments of the present invention.

FIG. 1 shows small thin panels 1 overlapped on window 3. Panels 1 are held in position between interior seal 4 and window 3 while the window is in the up position.

Figure 2:
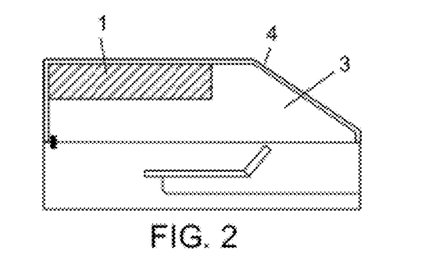

In FIG. 2 window 3 is up and thin panel 1 is held upward after being compressed by seal 4.

Figure 3:
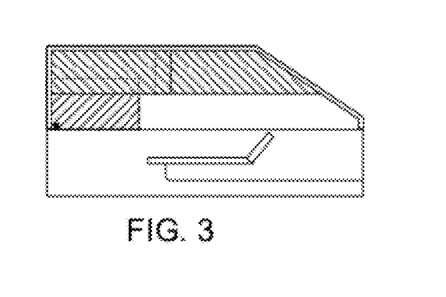

In FIG. 3 it is shown that panels can be cut into various shapes and placed at various locations for a complete shade or a partial shade.

Figure 4:
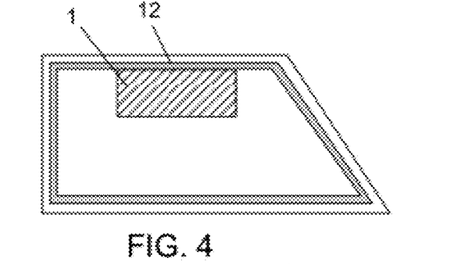

FIG. 4 shows automotive window glass trim or seal 12 inside a metal door frame. Seal 12 contacts the window glass. Panel 1's edge is inserted between the window glass and the seal and is held in position by compressive force (typical).

Figure 5:
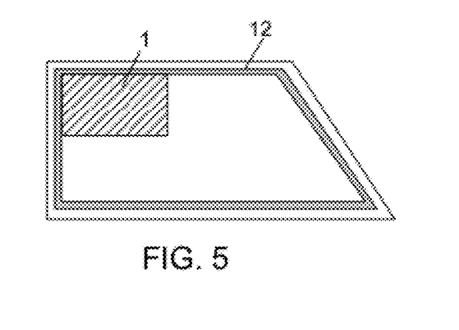

FIG. 5 shows panel 1 inserted in a different location than shown in FIG. 4. FIG. 5 also shows panel 1 utilizing an attachment device to attach itself. The attachment device 19 is the portion of panel 1 that inserts between the window and the seal or trim. Applicant prefers to refer to attachment device 19 as either Sun Shade Device or simply device 19.

Figure 6:
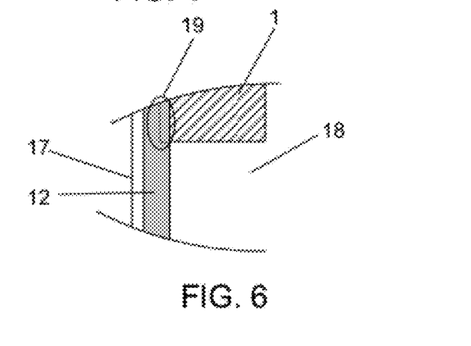

FIG. 6 shows a detailed view depicting frame 17, seal 12, panel 1 and window 18, device 19. This detail shows a "Sun Shade Device" invading the area between the seal and the window glass.

Sun Shade Panels and Devices

Panels 1 are preferably opaque and are inserted as described above. The panels are preferably synthetic and semi-flexible, yet stiff enough to insert often with one hand or remove without movement of the window. Alternatively, panels 1 may also be partially transparent. In a preferred embodiment, a panel 1 is a "flexible cutting mat" (also known as food processing polymer sheet) that is used in the kitchen. An example of a preferred flexible cutting mat is described in U.S. Pat. No. RE36717, which is incorporated by reference herein. Panel 1 may also be another synthetic cut sheet that is thin enough to insert as describe above.

Figure 8:
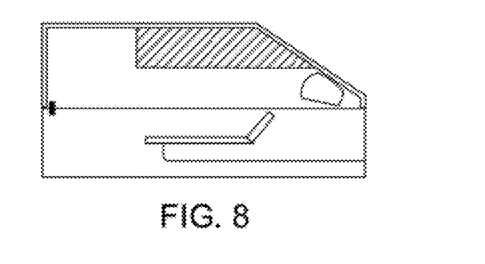

By inserting panel 1, the user is able to completely block or reduce the suns rays from entering the car and bothering the driver or the passengers. As shown above, panel sizes can be modified and panels can be used alone or in combination with other panels to completely or partially block the suns rays. The panels can be situated to maximize safe driving. The size of the panels can be varied as desired. Preferably, the thickness of panel 1 is between 0.010 in. to 0.15 in. Panels 1 can be modified as desired to achieve desired transparency, opaqueness and color. They can also be cut to size and shape. Because of the panel's consistency in thinness, this allows the cut edge to "insert", or "invade" the area between the glass and the seal or trim which causes that new edge to now become a "Sun Shade Device" when installed (FIG. 8). This is unique to a sun shade panel in characteristics. However, a 'Sun Shade Device' can be adapted to other products, and is not limited to a Sun Shade Panel only.

A "Sun Shade Device" is recognizable by its ability to 'invade' or 'insert', between those 'compressive forces' as noted herein. This "device" can hold or support another product attached to it, in place of a 'panel' or in combination with a panel. A Sun Shade "Panel" blocks or screens the sun rays, and can create a unique 'seal' between it and a "Sun Shade Device." Both the 'Panel' and the 'Device' are the unique discovery of Sun Shade. And while a panels edge can become a device, a device cannot become a panel this helps to define a 'panels' association with a 'device' while remaining uniquely different. Both the 'panel' and the 'device' are new in use, and new in operation and discovery.

Figure 7:
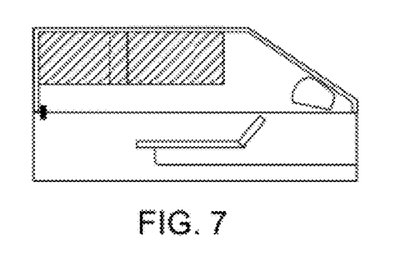
Figure 9:
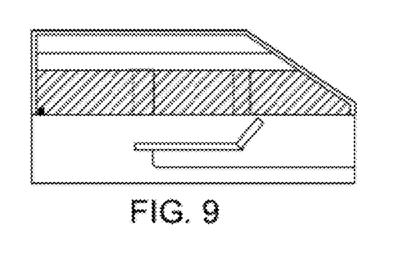
Figure 10:
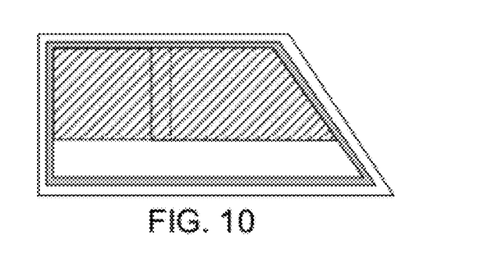
Figure 11:
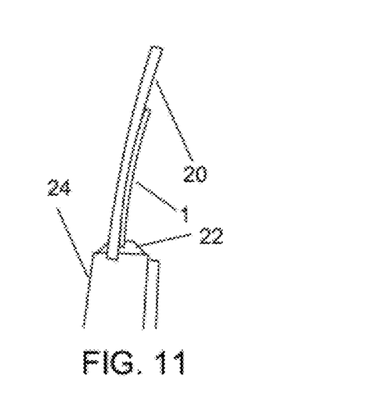

FIGS. 7-15 show other examples of usages of panels 1. In FIG. 7 the window is up and the panels are overlapping. In FIG. 8 the window is up and the panel is situated towards the front of the window. In FIG. 9 the window is open a few inches and the panels are inserted between the window and the door seal. In FIG. 10 the rear passenger window is nearly completely blocked by overlapping panels leaving just enough space so that childlike passengers in the back seat can see under the panels. FIG. 11 shows a side view cutaway of window 20 partially open and panel 1 inserted between window 20 and door seal 22 of door 24.

Figure 12:
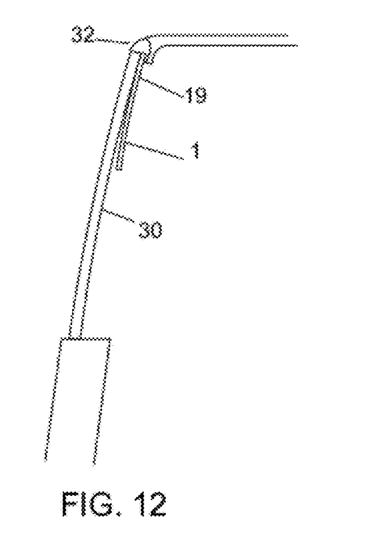

In FIG. 12 we see the association of "panel" 1 with a "device" 19. The panel has been inserted between window 30 and seal 32. Seal 32 is connected to the roof of the car. The compressive force between the window 30 and seal 32 holds panel 1 in place. (device 19 is connected to panel 1 which is typical of all drawings and panels) Thus it can be said, "panel 1 is inserted" when in reality the entire panel is not inserted, only the edge of the panel which is the "Device 19". A device 19 can be attached to a host of products, with or without the use of panel 1.

Figure 13:
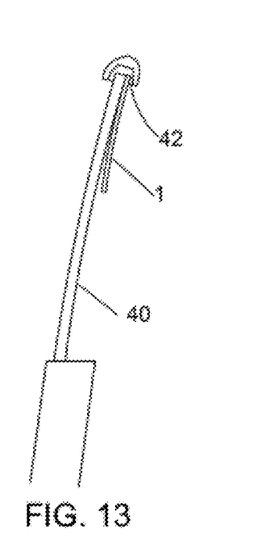

In FIG. 13 panel 1 has been inserted between window 40 and seal 42. Seal 42 is attached to the metal door frame. The compressive force between the window and seal 42 holds panel 1 in place. This results in the ability to seal out sun rays.

Figure 14:
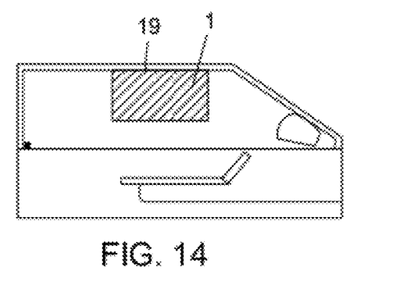

FIG. 14 shows another view with panel 1 held in place as desired. Note panel 1 has four edges in a rectangle shape, but only one "device" 19 in operation (typical of all panels 1).

Figure 15:
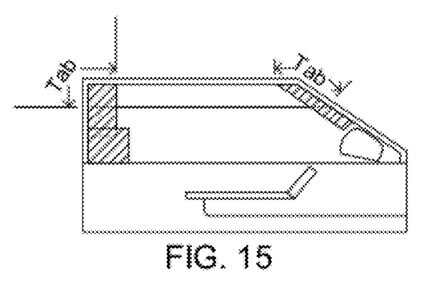

FIG. 15 shows overlapping panels utilizing a tab effect to help hold the panels in place while the window is partially down.

Figure 16:
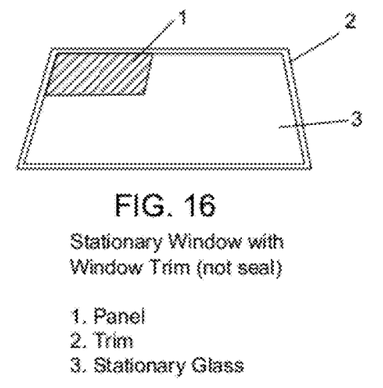

FIG. 16 shows a stationary window with window trim (not seal).

Figure 17:
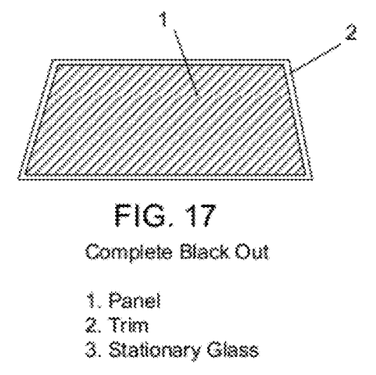

FIG. 17 shows a complete black out.

Figure 18:
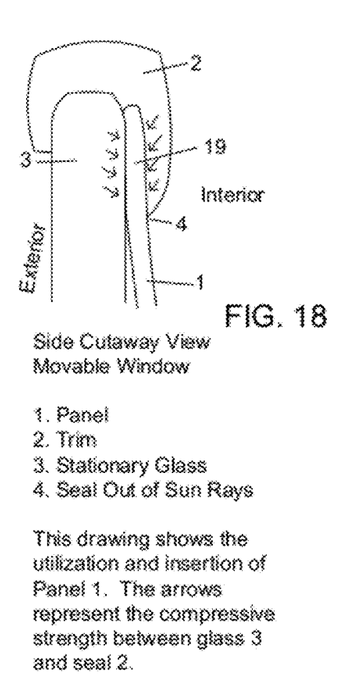
FIGS. 18-19 shows side views of preferred embodiments of the present invention.

FIG. 18 shows a side cutaway view for a movable window.

Figure 19:
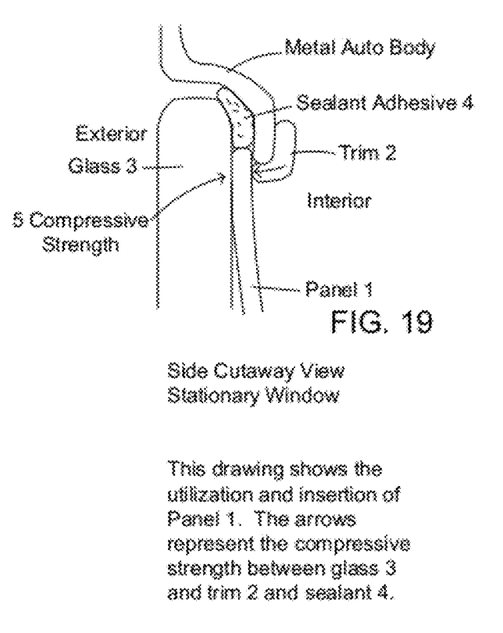

FIG. 19 shows a side cutaway view for a stationary window.

It should be noted that panel 1 can be fabricated from a variety of materials including synthetics, vinyls, silicones, polymers, plastics, organic or inorganic. A variety of compounds or composites, various sheeting material, or any material or device that can invade the space between the window and the seal or trim can be utilized. Panel 1 may also be artificial or natural. Paper and cardboard products are excluded and avoided because they may become fouled, dirty and they may rip or become otherwise unusable. Metal products may be used if coated, in "device 19" applications (FIGS. 3, 6, 12, 14, 18), also in "panel 1" (FIG. 1 to 19) applications if light enough. Unless the metal is coated, bare metal products are also avoided because they may scratch or damage the automobile. Coated metal products are thinner than mentioned for polymers or composition composites mentioned or alluded to herein.

Some Advantages of the Present Invention

Panel 1 is a superior sun shade device in that it very effectively seals out sun rays. Panel 1 slides between the vehicle glass and its seal or trim and the compressive strength already there is now utilized in a new way. Not only is the window still sealed against water, as the original purpose (to seal out outside air or water), but that compressive strength can now be used to hold a device in position. Panel 1 seals out the harmful sun ray's as they cannot now penetrate between panel 1 and the edge of the window. This gives the driver and passenger greater comfort and protection.

Other Features of the Present Invention

The discovery of a new use for the compressive strengths that exist between a window glass and its weather seal (i.e., a movable window) and the trim surrounding the perimeter of the glass (i.e., a non-movable window). This new use is the discovery and the utilization of the compressive strengths to hold the device without the use of hooks, suction cups, adhesive, or the like. The use of the compressive strengths is possible without the compromise of the original intention.

A device when installed utilizing the compressive strength must invades the areas between the window glass and the window seal on the interior of a vehicle (i.e., a movable window). Otherwise, as in the case of the stationary window glass, the compressive strengths are present between the interior window glass and the trim around the window. Panel 1 is preferably polymeric or synthetic and preferably waterproof. As in the case of polymer food processing sheets or mats, they are flexible yet stiff enough to install, often with one hand. A preferred food processing sheet is shown in U.S. Pat. No. RE36717.

The ability to insert panel 1 without the need to move the window.

The new use of food processing sheets to shade the sun's rays.

The new method of insertion or sliding a device into this position results in great location for a device and creates the windows ability to not only seal out rain or foul air, but also now sun rays by utilization of the compressive strengths and a thin polymer sheet. The sun rays are not allowed to penetrate between the device and the windows edges. This is unique and superior and now allows drivers and passengers an increase in safety and comfort, like never before.

Some Features of a Preferred Sun Shade Panel

"A Sun Shade Device"
1) Any material that "invades" or "inserts" utilizing the "compressive strengths" with the inclusions and exclusions mentioned herein and illustrated.
2) Any Product that has a Sun Shade Device attached to it (mentioned above) "A Sun Shade Panel"

3) Any Panel utilizing a panels description herein that has a "Sun Shade Device" in characterization and use, both inclusions and exclusions. The panels block, filter, or reduce sun rays within a vehicle.

It should also be understood that both the surfaces of each (panels or devices) could either be bumpy, or smooth, or grooved, or have ridges, in regular or irregular consequential sequence.

Other Preferred Embodiments

Stackability of Panels

The shade panels can be stacked so as to provide maximum comfort to the driver and passengers while not impeding their view or safety. As the conditions of sunlight change the passengers are able to add or delete the panels as preferred.

Smooth Panels do not Stick to the Window Glass as it is Raised and Lowered

In a preferred embodiment, shade panels 111 (FIG. 21) are smooth and heavy. They are of sufficient texture and weight so that they do not move and they retain their position as window 131 is raised and lowered. A preferred shade panel is a plastic transparent flexible cutting mat that is tinted. The driver can clearly see objects and road signs through the mat, but the tint of the mat is such that it blocks out sunlight in a fashion similar to sunglasses. In one preferred embodiment approximately a shade panel 111 is tinted to block out approximately 25 percent of the sunlight. Also, in a preferred embodiment, shade panel 111 is treated to provide 100% UVA and UVB protection from the sun.

Sun Shade Panel Kit

Figure 20:
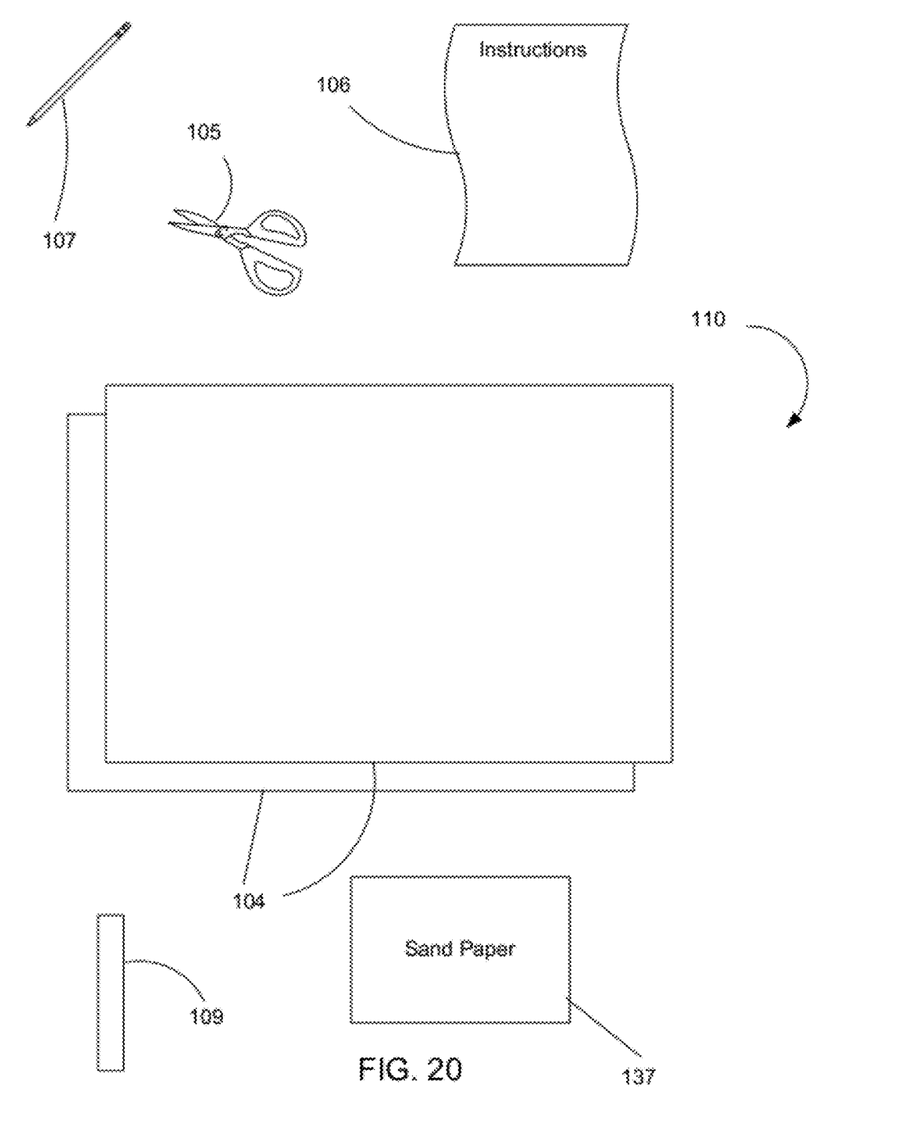
FIG. 20 shows preferred components of a preferred sun shade panel kit.

In a preferred embodiment, sun shade panels are sold as a kit 110. As shown in FIG. 20, preferred sun shade panel kit 110 includes two 16 in.×20 in. rectangular panels 104, scissors 105, pencil 107, double sided tape 109, sand paper 137 and instructions 106.

The utilization of kit 110 allows for a customization of sun protection through the window that can be modified and optimized even as the car turns. Utilizing pencil 107, the driver or passenger draws a custom sized pattern onto rectangular panel 104. Custom sized panels can be cut with scissors 105 for a specific window size, window shape and desired location of the sun panels. By utilizing kit 110, the driver can cut the exact size panels he needs to fit his window size. After cutting the shade panel, the rough edges of the newly cut panel can be sanded utilizing sand paper 137. With the newly cut and sanded shade panels, the driver can now stack the panels as appropriate to get the desired effect of sun protection.

For example, in a preferred embodiment, plastic sun shade panel 110 is tinted and transparent (as explained above). The driver and passengers can control the degree of sunlight that may shine through sun shade panels 110. Also as stated above, in a preferred embodiment each sun shade panel 110 is transparent and offers 100 percent UVA and UVB protection. Each panel is tinted to block 25 percent of the light.

Figure 21:
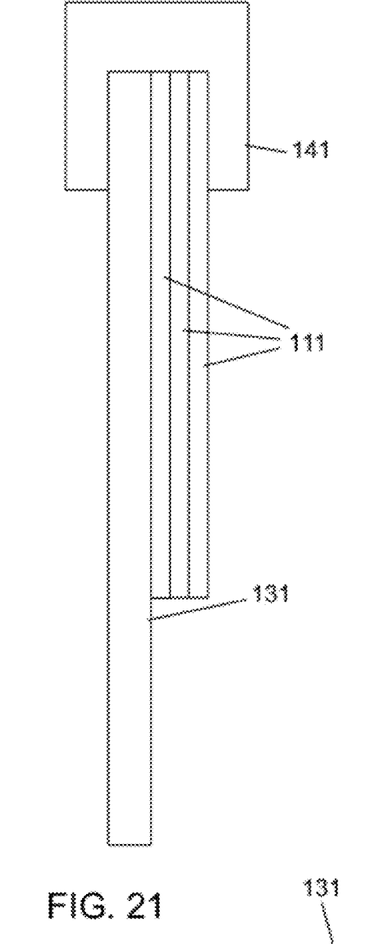
FIGS. 21-23B show a preferred method of stacking sun shade panels.
Figure 21B:
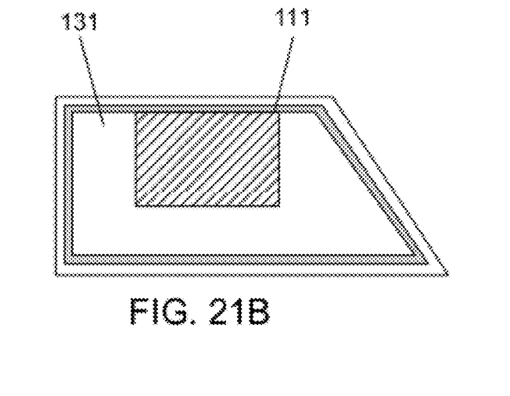
Figure 22:
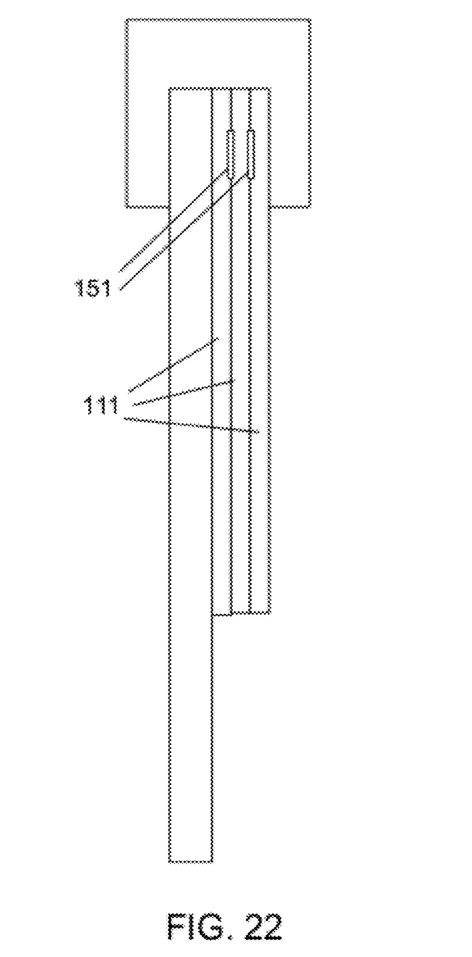

In FIGS. 21 and 21B, the driver has cut 3 custom size panels 111 out of sun shade panel 110 and stacked them against side window 131. Sun shade panels 111 are held in place due to the compressive force between upper seal 141, sun shade panels 111 and window 141. Each panel alone blocks 25 percent of light. Together the three panels block 75 percent of the light. To block all light from entering the driver only needs to slide another panel 111 into the stack. To allow more light to enter the car the driver can remove one of the panels. As stated above, in most cases the compressive force exerted on shade panels 111 will be enough to hold them in place. In another preferred embodiment, the driver can get extra strength by utilizing double sided tape 151 to hold sun shade panels 111 in place next to each other.

Figure 23:
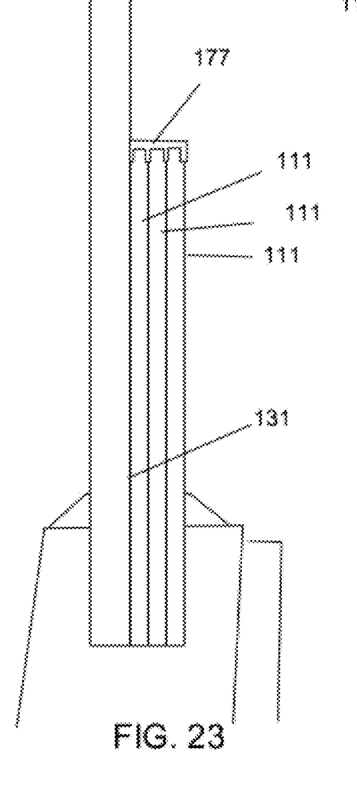
Figure 23B:
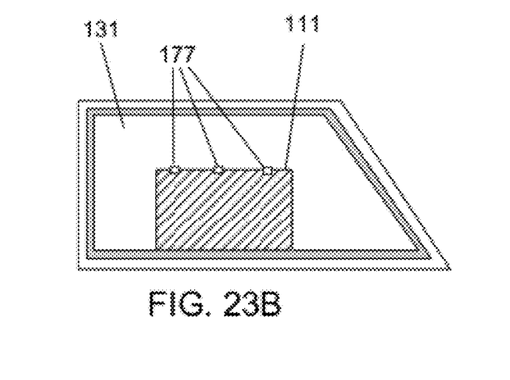

FIG. 23 shows a side view and FIG. 23B shows a front view of panels 111 stacked adjacent to window 131 at the bottom edge of window 131. Clip 177 is being utilized to hold panels 177 together.

It should be noted that in a preferred embodiment panels 111 will hold their position while window 131 is rolled up or down while the panel is in full or partial contact with the windows interior glass face and the windows seal. This has proven true in window frames of various vehicles with differing compressive strengths between the seal and window and various makes and models of manufacture. For example, the Toyota® automobile seals usually have an extremely tight window seal compression. In comparison, Chrysler® automobiles have a compressive strength of approximately 25 percent of a Toyota® automobile. Yet both vehicles effective seal out rain, wind and dust.

Applicant has found that the weight and texture of the flexible cutting mat described in U.S. Pat. No. RE36717 is uniquely different from any other prior art shade panels. The flexible cutting mat is smooth and dense. Therefore it has substantial weight and is sufficiently smooth so that it does not grip the glass when the window is raised or lowered. For example the flexible cutting mat works well and maintains its position in both extremes of compressive strengths while rolling the window up or down. Position is appropriately maintained if only one sun shade panel 111 is used or if sun shade panels are stacked as described above.

Preferred Method of Installing Panels

Figure 24:
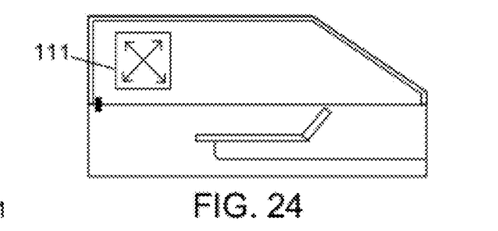
FIG. 24 shows a preferred method for diagonally sliding a sun shade panel.

A preferred method of installing panels 111 is by slipping the panels into position. This occurs when the panels are slid in a diagonal direction in relation to the window frame and seal (FIG. 24). The diagonal force is greater than the compressive force between the glass and seal. One or 2 hands can be used. The removal of panel 111 is also preferably diagonal as well.

Preferred Texture of Sun Shade Panels

Figure 25:
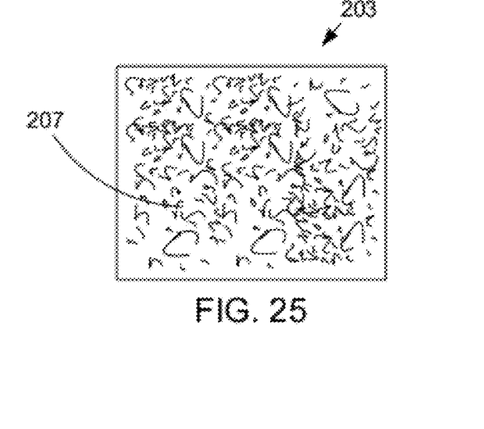
FIG. 25 shows another preferred embodiment of the present invention.

In a preferred embodiment, the sun shade panels are fabricated from hard plastic having a rough sandpaper-like surface. As shown in FIG. 25 sun shade panel 203 has rough sandpaper like surface 207. Because panel 203 is hard plastic, it will not grip the window as the window is raised and lowered. However, because panel 203 has a rough surface, it will grip an adjacent panel 203 if the panels are stacked as described above. This minimizes the need for clip 177 (FIG. 23) or double sided tape when panels are stacked.

Although the above-preferred embodiments have been described with specificity, persons skilled in this art will recognize that many changes to the specific embodiments disclosed above could be made without departing from the spirit of the invention. Although the above preferred embodiment states double sided tape 109 can be included in kit 110, it should be understood that other types of shade panel joining devices can but utilized. For example, FIG. 23 shows shade panel clip 177 joining panels 111. For example, even though Applicant refers to the utilization of panel 1 with an automobile, it should be understood that panel 1 may be used with any vehicle having windows.

What is claimed is:

1. A method for blocking sun rays from shining through the side windows of a vehicle, said method comprising the steps of:
   A) cutting a plurality of custom sized sun shade panels,
   B) inserting a first custom sized sun shade panel of said plurality of custom sized sun shade panels between a window and a window seal of said vehicle,
   C) inserting at least one other custom sized sun shade panel adjacent to said first custom sized sun shade panel so as to form a stack of said custom sized sun shade panels,
   D) adjusting the number of said stack of said custom sized sun shade panels to achieve a desired blockage of sun rays from entering said vehicle.

2. The method as in claim 1, wherein said cutting of said plurality of custom sized sun shade panels is accomplished by utilization of scissors.

3. The method as in claim 1, further comprising the step of acquiring a sun shade panel kit, said sun shade panel kit comprising:
   A) at least one standard sized sun shade panel,
   B) a pair of scissors for cutting said at least one standard sized sun shade panel,
   C) a set of instructions,
   D) a pencil for drawing a custom sized sun shade panel onto said at least one standard sized sun said panel.

4. The method as in claim 3 further comprising double sided tape for attaching adjacent custom sized shade panels.

5. The method as in claim 3 further comprising a clip for attaching adjacent custom sized shade panels.

6. The method as in claim 1 wherein said custom sized sun panels are plastic.

7. The method as in claim 1, wherein said custom sized sun panels are cut from at least one flexible cutting mat.

8. The method as in claim 1 wherein said custom sized sun panel is tinted and transparent.

9. The method as in claim 1 wherein said custom sized sun panel blocks UVA and UVB rays.

10. The method as in claim 1, wherein said stack of said custom sized sun shade panels remain in place as said window is raised and lowered.

11. The method as in claim 1, wherein each of said plurality of custom sized shade panels is fabricated from hard plastic and comprises a rough surface, wherein said hard plastic fabrication allows for slippage between said window and said custom sized shade panel as said window is raised and lowered, and wherein said rough surface allows for gripping between stacked custom sized shade panels as said window is raised and lowered.

12. A device for blocking sun rays from shining through the side windows of a vehicle, said device comprising:
   A) a plurality of custom sized sun shade panels, wherein said plurality of custom sized sun shade panels block sun rays from shining through the side windows of a vehicle by:
      1. inserting a first custom sized sun shade panel of said plurality of custom sized sun shade panels between a window and a window seal of said vehicle,
      2. inserting at least one other custom sized sun shade panel adjacent to said first custom sized sun shade panel so as to form a stack of said custom sized sun shade panels, and
      3. adjusting the number of said stack of said custom sized sun shade panels to achieve a desired blockage of sun rays from entering said vehicle.

13. The device as in claim 12, wherein said device is part of a sun shade kit, said sun shade kit comprising:
   A) at least one standard sized sun shade panel,
   B) a pair of scissors for cutting said at least one standard sized sun shade panel,
   C) a set of instructions,
   D) a pencil for drawing a custom sized sun shade panel onto said at least one standard sized sun said panel.

14. The device as in claim 12 further comprising double sided tape for attaching adjacent custom sized shade panels.

15. The device as in claim 12 further comprising a clip for attaching adjacent custom sized shade panels.

16. The device as in claim 12 wherein said stack of said custom sized sun shade panels remain in place as said window is raised and lowered.

17. The device as in claim 12, wherein each of said plurality of custom sized shade panels is fabricated from hard plastic and comprises a rough surface, wherein said hard plastic fabrication allows for slippage between said window and said custom sized shade panel as said window is raised and lowered, and wherein said rough surface allows for gripping between stacked custom sized shade panels as said window is raised and lowered.

\* \* \* \* \*